(12) United States Patent  (10) Patent No.: US 7,791,830 B2
Miyashita  (45) Date of Patent: Sep. 7, 2010

(54) SIGNAL PROCESSING CIRCUIT AND MAGNETIC STORAGE APPARATUS

(75) Inventor: Youichi Miyashita, Kawasaki (JP)

(73) Assignee: Toshiba Storage Device Corporation, Tokyo (JP)

( * ) Notice: Subject to any disclaimer, the term of this patent is extended or adjusted under 35 U.S.C. 154(b) by 201 days.

(21) Appl. No.: 12/235,387

(22) Filed: Sep. 22, 2008

(65) Prior Publication Data

US 2009/0237827 A1  Sep. 24, 2009

(30) Foreign Application Priority Data

Mar. 21, 2008  (JP) .............................. 2008-073268

(51) Int. Cl.
*G11B 5/035* (2006.01)
(52) U.S. Cl. .............................. 360/65; 360/46; 360/66
(58) Field of Classification Search ........................ None
See application file for complete search history.

(56) References Cited

U.S. PATENT DOCUMENTS 6,067,198 A * 5/2000 Zuffada et al. ................ 360/46
6,744,580 B2 * 6/2004 Hattori et al. ................. 360/40
6,928,111 B2 * 8/2005 Kim ............................ 375/231
7,542,527 B2 * 6/2009 Ogawa et al. ............... 375/340
7,595,948 B1 * 9/2009 Oberg .......................... 360/25

FOREIGN PATENT DOCUMENTS

JP  A 7-14103  1/1995
JP  A 11-167565  6/1999

* cited by examiner

*Primary Examiner*—Jason C Olson
(74) *Attorney, Agent, or Firm*—Greer, Burns & Crain, Ltd.

(57) ABSTRACT

A signal processing circuit performs processing for an analog signal output from a head. The signal processing circuit includes: a conversion section that generates a digital signal based on the analog signal; a first filter that equalizes the output of the conversion section; a demodulation section that demodulates data from the output of the first filter; a modulation section that modulates a waveform based on the data demodulated by the demodulation section; a second filter that equalizes the output of the modulation section; and an adaptation section that adapts the response of the second filter such that the output of the second filter becomes equal to the output of the conversion section.

20 Claims, 7 Drawing Sheets

$$Du = \frac{\text{HALF-VALUE WIDTH [BIT TIME]}}{T} = \frac{\text{HALF-VALUE WIDTH [SAMPLE NUMBER]}}{N}$$

SIGNAL PROCESSING CIRCUIT AND MAGNETIC STORAGE APPARATUS

BACKGROUND OF THE INVENTION

1. Field of the Invention

The present invention relates to a signal processing circuit that performs processing for an analog signal output from a head and a magnetic storage apparatus.

2. Description of the Related Art

For determining the quality of a head and a medium, a measurement of a read signal read out from the medium using the head is performed in the course of development and production of a magnetic storage apparatus such as an HDD (Hard Disk Drive). As one measurement method, there is known a technique of writing a solitary wave or a specific pattern on a medium and measuring a read signal through a measurement instrument. Recoding bit density (Du) obtained from the measurement is an important measurement item related to the quality and design of the head and medium.

Further, as one method for obtaining optimum setting parameters in signal equalization processing of an RDC (Read Channel Combo), there is known a method that requires a waveform of a solitary wave or the like actually measured. Concretely, the method writes a necessary pattern on a medium, reads the pattern on the medium, loads the waveform in a computer through a measurement instrument, and calculates optimum setting parameters in the computer.

However, in order to perform a measurement using the solitary wave, much man-power, man-hour, and an instrument for the measurement are required, which results in increase of cost. Further, it is difficult to calculate optimum setting parameters for each magnetic storage apparatus in its mass-production process. Further, in the case where an evaluation of a single LSI (Large Scale Integration) is performed without using the head and medium, an expensive facility, such as an arbitrary waveform generator, is required for generating an input signal to the LSI, thereby increasing cost.

SUMMARY OF THE INVENTION

The present invention has been made to solve the above problems, and an object thereof is to provide a signal processing circuit capable of extracting a predetermined waveform from a signal read from a medium using a head and a magnetic storage apparatus.

To solve the above problem, according to an aspect of the present invention, there is provided a signal processing circuit that performs processing for an analog signal output from a head, including: a conversion section that generates a digital signal based on the analog signal; a first filter that equalizes the output of the conversion section; a demodulation section that demodulates data from the output of the first filter; a modulation section that modulates a waveform based on the data demodulated by the demodulation section; a second filter that equalizes the output of the modulation section; and an adaptation section that adapts the response of the second filter such that the output of the second filter becomes equal to the output of the conversion section.

According to another aspect of the present invention, there is provided a magnetic storage apparatus including: a medium onto which data is written; a head that performs readout operation from the medium so as to output a result of the readout operation as an analog signal; a conversion section that generates a digital signal based on the analog signal output from the head; a first filter that equalizes the output of the conversion section; a demodulation section that demodulates data from the output of the first filter; a modulation section that modulates a waveform based on the data demodulated by the demodulation section; a second filter that equalizes the output of the modulation section; and an adaptation section that adapts the response of the second filter such that the output of the second filter becomes equal to the output of the conversion section.

According to the disclosed signal processing circuit and magnetic storage apparatus, it is possible to extract a predetermined waveform from a signal read from a medium using a head.

DETAILED DESCRIPTION OF THE PREFERRED EMBODIMENTS

Embodiments of the present invention will be described below with reference to the accompanying drawings.

First Embodiment

First, a configuration of an HDD according to the present embodiment will be described.

Figure 1:
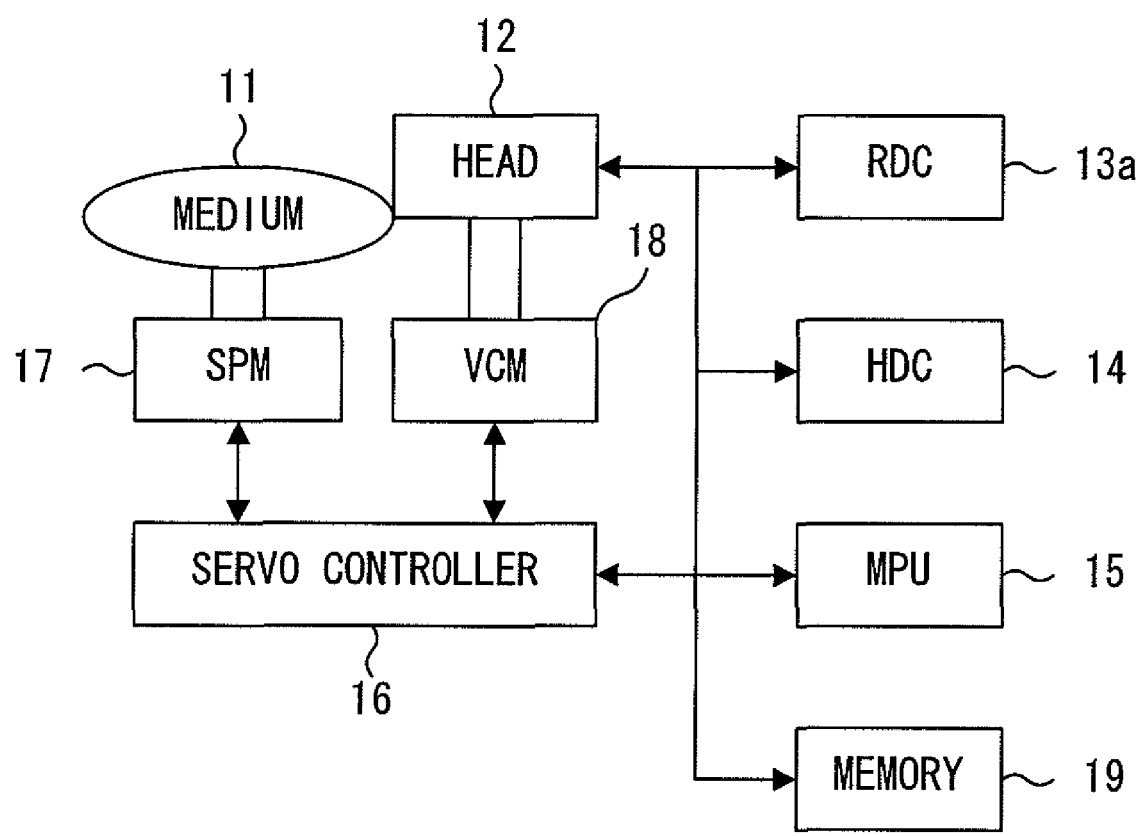
FIG. 1 is a block diagram showing an example of a configuration of an HDD according to a first embodiment.

FIG. 1 is a block diagram showing an example of a configuration of an HDD according to the present embodiment. A magnetic storage apparatus of FIG. 1 includes a medium 11, a head 12, an RDC 13a (signal processing circuit), an HDC (Hard Disk Controller) 14, an MPU (Micro Processing Unit) 15, a servo controller 16, an SPM (Spindle Motor) 17, a VCM (Voice Coil Motor) 18, and a memory 19.

The medium 11 is a magnetic disk. The head 12 performs data write and read operation for the medium 11. The RDC 13a is an LSI, which demodulates a read signal. The HDC 14 communicates with a host (computer). The MPU 15 controls the respective components in the HDD. The servo controller 16 controls the SPM 17 and VCM 18. The SPM 17 drives the medium 11. The VCM 18 drives the head 12. The memory 19 stores information required for operation of the MPU 15.

Figure 2:
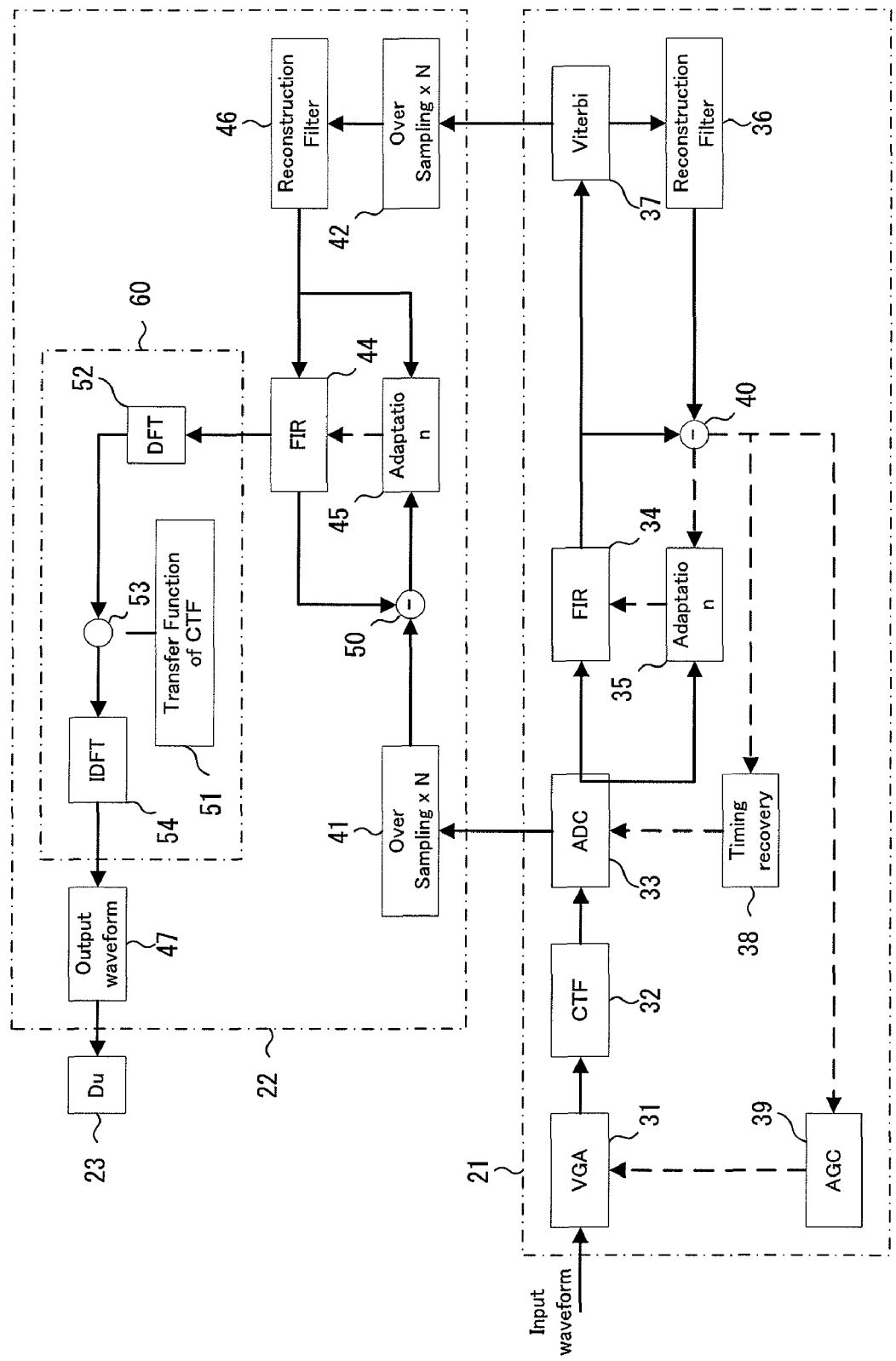
FIG. 2 is a block diagram showing an example of a configuration of an RDC according to the first embodiment.

FIG. 2 is a block diagram showing an example of a configuration of the RDC according to the present embodiment. The RDC 13a according to the present embodiment includes a read processing section 21, a waveform extraction section 22, a recording bit density calculation section 23.

The read processing section 21 demodulates a read signal read from the medium 11 using the head 12 so as to output 1/0 data. The waveform extraction section 22 extracts a predetermined waveform from a signal of the read processing section 21. The waveform that the waveform extraction section 22 extracts includes, e.g., a solitary wave and Di-Pulse. It is assumed, in the present embodiment, the 2 0 waveform extraction section 22 extracts the solitary wave.

The read processing section 21 includes a VGA (Variable Gain Amplifier) 31, a CTF (Continuous Time Filter) 32 (third filter), an ADC (Analog Digital Converter) 33 (conversion section), an FIR (Finite Impulse Response) 34, (first filter), an adaptation section (Adaptation) 35, a reconstruction filter (Reconstruction filter) 36, a Viterbi detector 37 (Viterbi) (demodulation section), a Timing compensation section (Timing Recovery) 38, an AGC (Automatic Gain Controller) 39, and a subtracter 40.

The extraction waveform is represented by Ci, the reproduction characteristic of the head 12 is represented by PR (1,−1). The PR (1,−1) is a read waveform obtained in the case where the head 12 reproduces data "1" (before and after the data "1" is data "0"), which represents Di-Pulse (waveform in which a negative pulse follows a positive pulse). When the data "1" is read by the head 12, a read signal input to the RDC 13a is represented by 1*Ci*PR(1,−1). The symbol * represents a convolution operator.

The read signal (Input waveform) input to the RDC 13a is adjusted to a constant amplitude by the VGA 31. Subsequently, the output of the VGA 31 is subjected to filtering by the CTF 32 which is an analog LPF (Low Pass Filter) and is then converted into a digital value by the ADC 33. The output of the ADC 33 is subjected to filtering by the FIR 34 for equalization and is then demodulated as binary data taking values 0 or 1 by the Viterbi detector 37. Assuming that the time response of the CTF 32 is Cctf, the output of the ADC 33 is represented by 1*Ci*PR(1,−1)*Cctf. The output of the Viterbi detector 37 is represented by 1.

The reconstruction filter 36 performs ×(1-D) operation (operation of convolving PR(1,−1)) for the output of the Viterbi detector 37 to thereby reconstruct the read 15 waveform. The subtracter 40 calculates a difference between the output of the FIR 34 and output of the Reconstruction Filter 36 as an error. The adaptation section 35 uses the output of the reconstruction filter 36 and the error amount to adapt the TAP value of the FIR 34. The TAP adaptation algorithm of the adaptation section 35 is known as an LMS (Least Mean Square) method, etc.

The timing compensation section 38 uses the error amount to compensate the sample timing of the ADC 33. The AGC 39 uses the error amount to adapt the gain of the VGA 31.

The waveform extraction section 22 includes an over sampling section 41 (Over Sampling ×N) (first over sampling section), an over sampling section 42 (Over Sampling ×N) (second over sampling section), an FIR 44 (second filter), an adaptation section 45 (adaptation) (adaptation section), a reconstruction filter (Reconstruction Filter) 46 (modulation section), an extraction waveform storage section 47, a subtracter 50, and a CTF characteristic removal section 60 (removal section).

A signal synchronously sampled with an input signal by the ADC 33 is n-times over-sampled by the over sampling section 41. The over sampling number N determines the accuracy (resolution) of the extraction waveform (to be described later). In the present embodiment, N is set to 4. The subtracter 50 calculates a difference between the output of the over sampling section 41 and output of the FIR 44 as an error amount. The adaptation section 45 uses the output of the reconstruction filter 46 and the error amount to adapt the TAP value of the FIR 44. The TAP adaptation algorithm of the adaptation section 45 is known as an LMS method, etc.

The error amount which is the output of the subtracter 50 is converged to 0 by the operation of the adaptation section 45. Therefore, assuming that the converged time response (TAP value) of the FIR 44 is Cfir, 1*Ci*PR(1,−1)*Cctf=Cfir*1*PR (1,−1) is satisfied. That is, Cfir=Ci*Cctf is satisfied.

The FIR 34, FIR 44, adaptation section 35, and adaptation section 45 can be realized with the same circuit. The digital data sequence which is the output pf the Viterbi detector 37 is n-times over-sampled by the over sampling section 42 and is subjected to operation in accordance with the extraction waveform by the reconstruction filter 46. The output of the reconstruction filter 46 is equalized by the FIR 44.

In the case where the extraction waveform is a solitary wave, the reconstruction filter 46 performs ×(1-D) operation (*PR(1,−1)).

The above processing is repeatedly performed to adapt the TAP value of the FIR 44 which is the output of the adaptation section 45. The TAP value of the FIR 44 obtained as a result of the adaptation corresponds to the waveform of the output of the ADC 33.

In order to obtain the extraction waveform in the input signal to the RDC 13a, the CTF characteristic removal section 60 performs removal processing of the characteristics of the CTF 32 from the TAP value of the FIR 44. The CTF characteristic removal section 60 includes a transfer function storage section 51 (Transfer function of CTF), a DFT (Discrete Fourier Transform) 52, a divider 53, an IDFT (Inverse Discrete Fourier Transform) 54.

The DFT 52 performs DFT processing for the TAP value of the FIR 44. The divider 53 divides the output of the DFT 52 by the transfer function of the CTF 32 stored in the transfer function storage section 51. The IDFT 54 performs IDFT processing for the output of the divider 53 and stores the extraction waveform in the extraction waveform storage section 47 (register or memory).

That is, the CTF characteristic removal section 60 removes Cctf from the converged TAP value Ci* Cctf of the FIR 44 to obtain the extraction waveform (Output waveform) Ci.

In the case where the extraction waveform is Di-Pulse, the reconstruction filter 46 performs ×1 operation.

As a result, the extraction waveform (solitary waveform or Di-Pulse) in the input signal before filtering by the CTF 32 can be reproduced by a digital value (Reproduced Isolate Pulse/Reproduced Isolate Di-Pulse).

The solitary wave reproduced by a digital value as the extraction waveform as described above is referred to as "digital reproduction solitary wave". The digital reproduction solitary wave is stored in the extraction waveform storage section 47 for use.

Figures 3, 4:
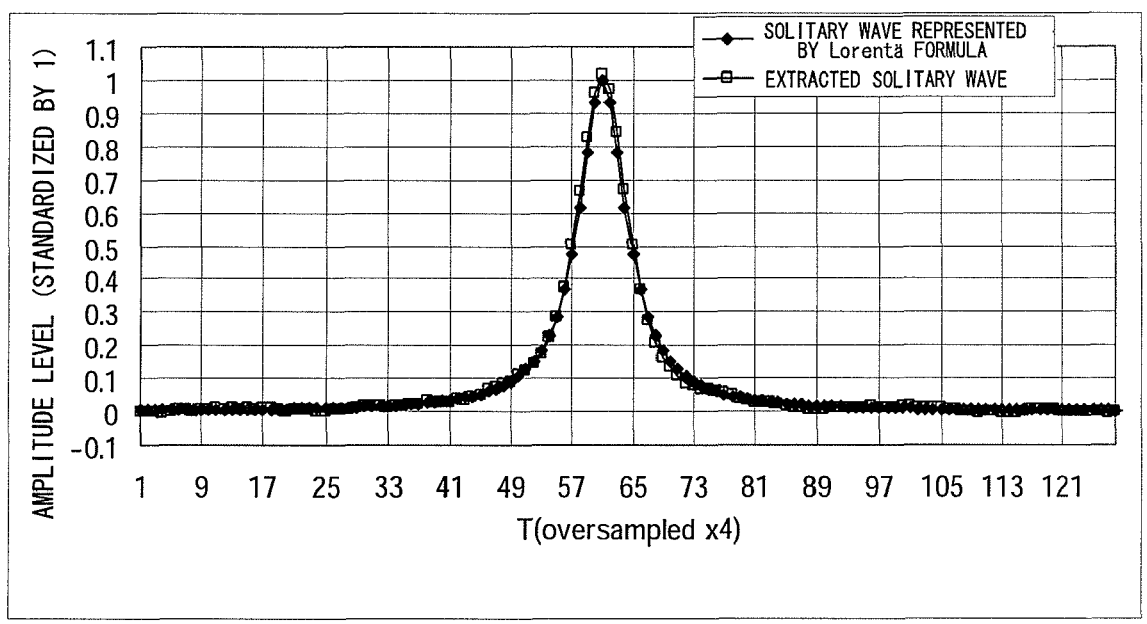
FIG. 3 is a view showing an example of a digital reproduction solitary wave according to the first embodiment.
FIG. 4 is a view showing an example of a recording bit density calculation formula according to the first embodiment.

FIG. 3 is a view showing an example of a digital reproduction solitary wave according to the present embodiment. This graph shows the waveform of a digital reproduction solitary wave and, for comparison, the waveform of a solitary wave represented by a Lorentz formula. The horizontal axis denotes the number of samples, and vertical axis denotes a standardized amplitude level.

A measurement method of the recording bit density (Du) using the digital reproduction solitary wave will next be described.

Conventionally, equipment such as an oscilloscope has been required for the measurement of the recording bit density Du and great care has been required in the measurement process. In the present embodiment, the recording bit density calculation section 23 reads out the digital reproduction solitary wave from the extraction waveform storage section 47 and uses the digital reproduction solitary wave and a recording bit density calculation formula to calculate the recording bit density (Du).

When a read command of reading an arbitrary waveform is input to the HDD from a computer, the HDD returns the Du value to the computer. The recording bit density calculation section 23 may be omitted from the HDD according to the present embodiment and, in this case, an external computer may calculate the recording bit density.

FIG. 4 is a view showing an example of the recording bit density calculation formula according to the present embodiment. In this formula, T is 1 bit time, and N is over sampling number.

Here, a half-value width of the digital reproduction solitary wave is calculated.

Figure 5:
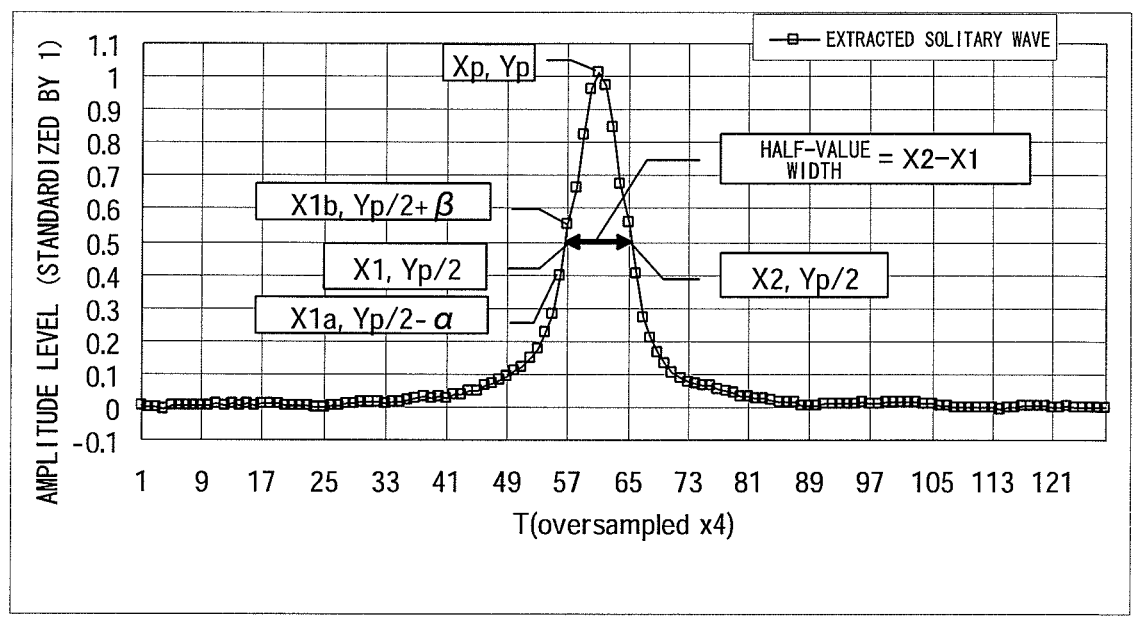
FIG. 5 is a view showing an example of a half-value width in the digital reproduction solitary wave according to the first embodiment.

FIG. 5 is a view showing an example of a half-value width in the digital reproduction solitary wave according to the present embodiment. It is assumed that the Xp-th sample value at which the peak of the digital reproduction solitary wave is Yp. Since the digital reproduction solitary wave has a digital value, the maximum value (=waveform peak) thereof can easily be calculated.

Then, the recording bit density calculation section 23 calculates, according to the definition of the half-value width, TAP positions X1 and X2 at which the TAP value becomes Yp/2 in the range of (1<X1<Xp) and (Xp<X2<TAP number), respectively. X1 can be obtained by linear interpolating two points of TAP positions (X1a, Yp/2−$\alpha$), (X1b, Yp/2+$\beta$) at which the TAP values become, e.g., values sandwiching Yp/2. X2 can be obtained in the same manner as X1. As a result, the recording bit density calculation section 23 calculates a half-value width (=X2−X1 [sample number]).

By incorporating the above recording bit density calculation section 23 in the RDC 13a, a single LSI of the RDC 13a can measure the Du from a read signal of an arbitrary pattern. Therefore, it is possible to eliminate the need to provide equipment such as an oscilloscope required for amplitude measurement or Du measurement, as well as to significantly reduce the effort involved in the measurement process. As a result, the Du can be measured for each individual HDD. Further, it is possible to accurately grasp Du trend in manufacturing process.

Second Embodiment

The FIR and adaptation section that perform waveform equalization can optimize the TAP value by reading and learning the waveform using a TAP adaptation function. However, when all the TAPs are made variable, divergence may occur. Thus, in conventional waveform equalization, several TAP values in the vicinity of the center are made fixed (fixed TAPs) and other TAP values are adapted. Therefore, the fixed TAPs have not been optimized by the adaptation section.

In the present embodiment, an RDC that calculates initial values of all the TAPs of the FIR will be described.

Figure 6:
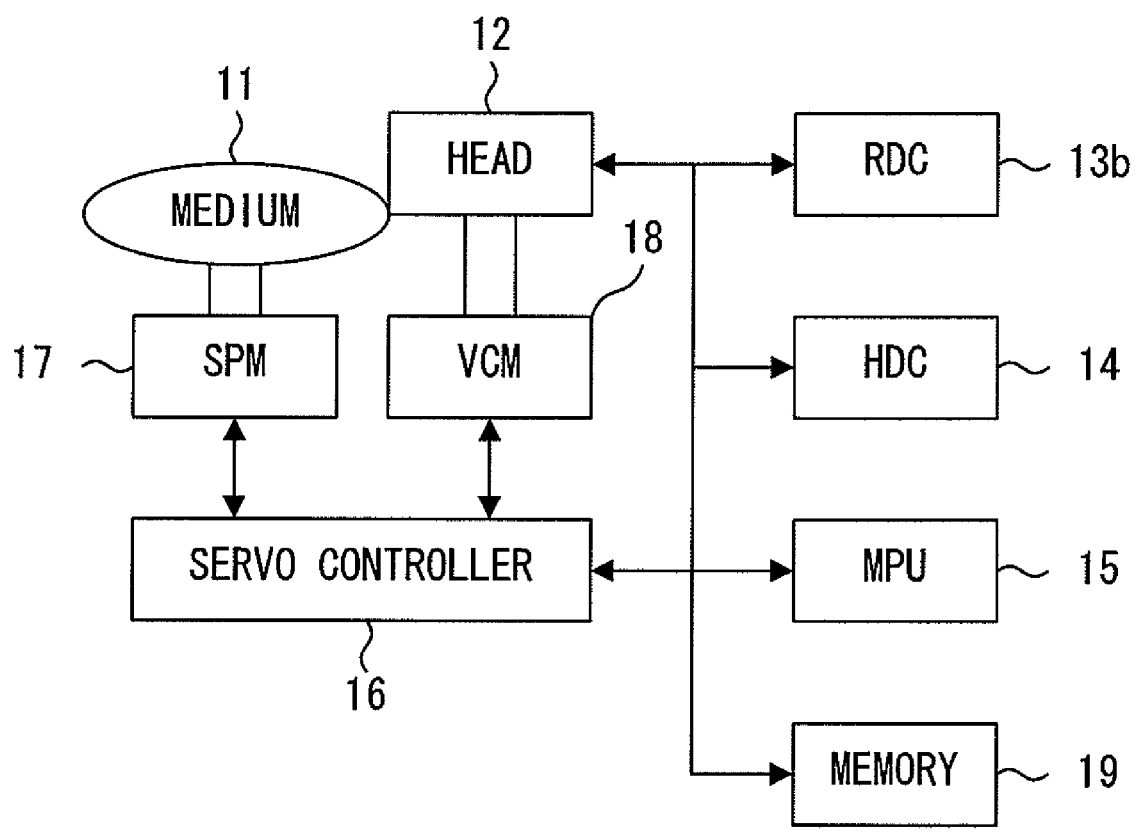
FIG. 6 is a block diagram showing an example of a configuration of an HDD according to a second embodiment.

FIG. 6 is a block diagram showing an example of a configuration of an HDD according to the present embodiment. In FIG. 6, the same reference numerals as those in FIG. 1 denote the same or corresponding parts as those in FIG. 1, and the descriptions thereof will be omitted here. As compared with the HDD of FIG. 1, the HDD of FIG. 6 includes an RDC 13b in place of the RDC 13a.

Figure 7:
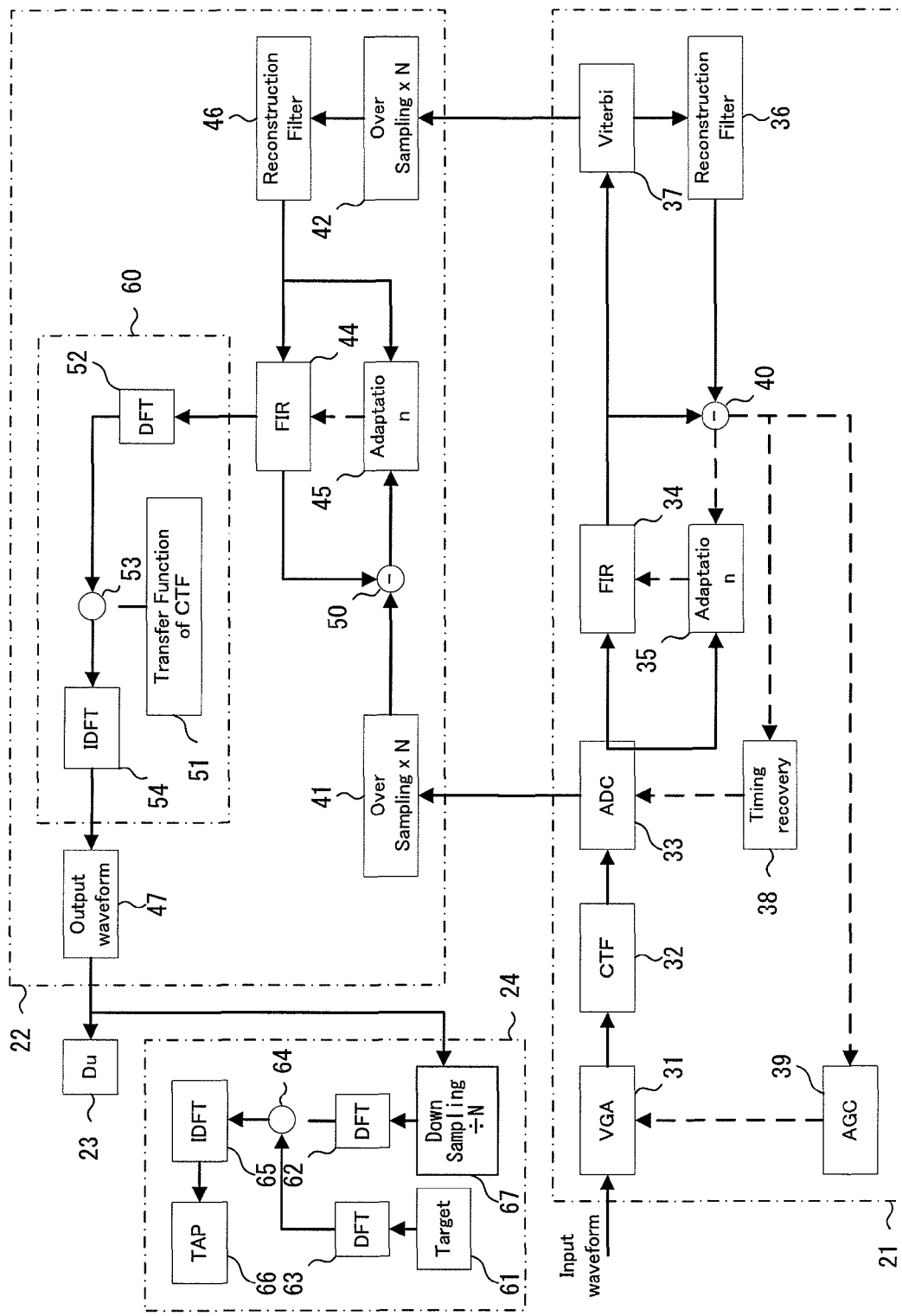
FIG. 7 is a block diagram showing an example of a configuration of an RDC according to the second embodiment.

FIG. 7 is a block diagram showing an example of a configuration of an RDC according to the present embodiment. In FIG. 7, the same reference numerals as those in FIG. 2 denote the same or corresponding parts as those in FIG. 2, and the descriptions thereof will be omitted here. As compared with the RDC 13a of FIG. 2, the RDC 13b of the present embodiment newly includes an optimization section 24 (response calculation section). The optimization section 24 includes an equalization target storage section 61 (Target), DFTs 62 and 63, a divider 64, an IDFT 65, a TAP value storage section 66 (TAP), and a down sampling section 67 (Down Sampling/N). The equalization target storage section 61 stores an equalization target of a solitary wave that has previously been sampled at bit time intervals.

First, operation of calculating the TAP initial value at the manufacturing time of the HDD will be described.

The down sampling section 67 down-samples a digital reproduction solitary wave stored in the extraction waveform storage section 47 to 1/N times to obtain a sample of bit time interval. The DFT 62 performs DFT processing for the output of the down sampling section 67. The DFT 63 performs DFT processing for an equalization target stored in the equalization target storage section 61. The divider 64 divides the output of the DFT 63 by the output of the DFT 62. The IDFT 65 performs IDFT processing for the output of the divider 64 and stores a TAP value of bit time interval which is a result obtained by the IDFT processing in the TAP value storage section 66.

The MPU 15 (write section) records the TAP value stored in the TAP value storage section 66 in the system area of the medium 11. The TAP value storage section 66 may be a non-volatile memory.

Next, operation of setting the TAP initial value at HDD start-up time will be described.

Every time the HDD is started up, the MPU 15 (response setting section) reads out the TAP value from the system area of the medium 11 to set the TAP value in the FIR 34. This allows the optimum value to be set for the fixed TAP as an initial value, increasing the accuracy of equalization by the FIR 34.

Third Embodiment

Conventionally, in order to input a read waveform of an arbitrary bit pattern to the RDC so as to perform a test of a single RDC, an expensive facility, such as an arbitrary waveform generator, has been required.

In the present embodiment, an RDC that generates, based on the digital reproduction solitary wave, a read waveform of an arbitrary bit pattern to be input to another RDC will be described.

Figure 8:
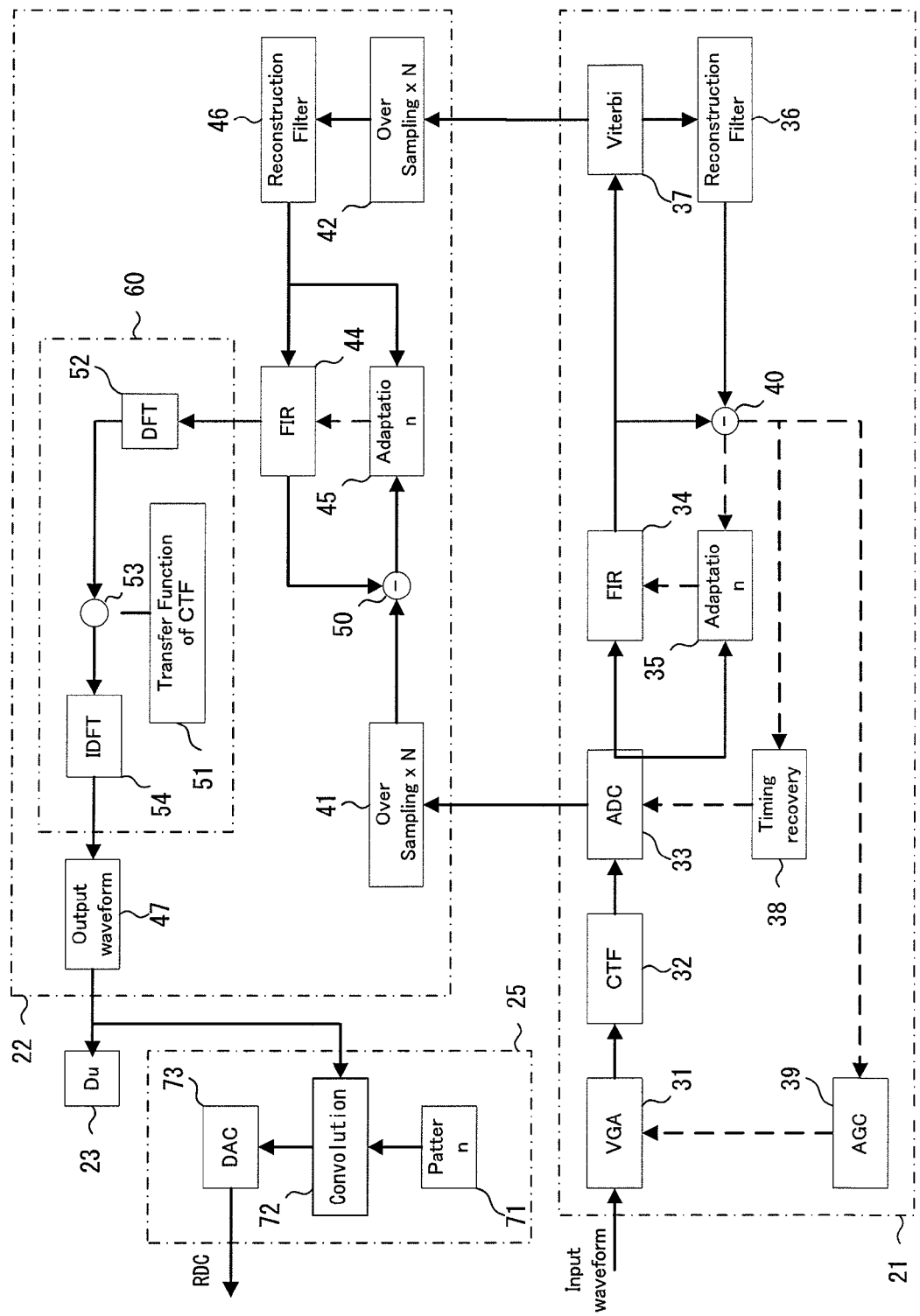
FIG. 8 is a block diagram showing an example of a configuration of an RDC according to a third embodiment.

FIG. 8 is a block diagram showing an example of a configuration of an RDC according to the present embodiment. In FIG. 8, the same reference numerals as those in FIG. 2 denote the same or corresponding parts as those in FIG. 2, and the descriptions thereof will be omitted here. As compared with the RDC 13a of FIG. 2, the RDC of the present embodiment newly includes a waveform generation section 25. The waveform generation section 25 includes an arbitrary pattern storage section 71 (Pattern), a convolution operation section 72 (Convolution), and a DAC (Digital Analog Converter) 73. The output of the DAC 73 is connected to another RDC to be used for a read signal.

The arbitrary pattern storage section 71 previously stores an arbitrary bit pattern. The convolution operation section 72 performs convolution operation between the digital reproduction solitary waveform stored in the extraction waveform storage section 47 and bit pattern stored in the arbitrary pattern storage section 71.

The DAC 73 converts a digital signal which is the output of the convolution operation section 72 into an analog signal so as to output the analog signal to another RDC. With this operation, it is possible to output the analog waveform which is modulated into an arbitrary bit pattern based on the digital reproduction solitary wave to another RDC to thereby perform a test. By utilizing such an RDC, it is possible to eliminate the need to prepare the arbitrary waveform generator.

The present invention can be embodied in various forms, without departing from the spirit or the main feature. Therefore, the aforementioned embodiments are merely illustrative of the invention in every aspect, and not limitative of the same. The scope of the present invention is defined by the appended claims, and is not restricted by the description herein set forth. Further, various changes and modifications to be made within the scope of the appended claims and equivalents thereof are to fall within the scope of the present invention.

What is claimed is:

1. A signal processing circuit that performs processing for an analog signal output from a head, comprising:
    a conversion section that generates a digital signal based on the analog signal;
    a first filter that equalizes the output of the conversion section;
    a demodulation section that demodulates data from the output of the first filter;
    a modulation section that modulates a waveform based on the data demodulated by the demodulation section;
    a second filter that equalizes the output of the modulation section; and
    an adaptation section that adapts the response of the second filter such that the output of the second filter becomes equal to the output of the conversion section.

2. The signal processing circuit according to claim 1, further comprising:
    a third filter that performs filtering of a read signal and inputs the filtered signal to the conversion section; and
    a removal section that removes the response of the third filter from the response of the second filter.

3. The signal processing circuit according to claim 1, wherein
    the waveform of the response of the second filter is a solitary wave, and
    the modulation section performs convolution processing of a Di-Pulse waveform for the output of the demodulation section.

4. The signal processing circuit according to claim 1, wherein
    the second filter is an FIR filter, and
    the response of the second filter is a TAP value of the second filter.

5. The signal processing circuit according to claim 1, further comprising:
    a first over sampling section that over-samples the output of the conversion section; and
    a second over sampling section that over-samples the output of the demodulation section, wherein
    the modulation section modulates the output of the second over sampling section, and
    the adaptation section adapts the response of the second filter such that the output of the second filter becomes equal to the output of the first over sampling section.

6. The signal processing circuit according to claim 2, wherein
    the waveform of the output of the removal section is a solitary wave, and
    the signal processing circuit further comprises a recording bit density calculation section that calculates a recording bit density based on the solitary wave output from the removal section.

7. The signal processing circuit according to claim 6, wherein
    the recording bit density calculation section calculates a half-value width of the solitary wave output from the removal section and then calculates the recording bit density based on the half-value width.

8. The signal processing circuit according to claim 2, further comprising a response calculation section that removes the response of an equalization target of the first filter from the output of the removal section and outputs a result of the removal as the response of the first filter.

9. The signal processing circuit according to claim 8, further comprising a response setting section that reads out the response of the first filter which is stored in a storage apparatus and sets the read out response in the first filter.

10. The signal processing circuit according to claim 2, further comprising a convolution operation section that stores the waveform of the output of the removal section, performs convolution operation of the stored waveform for an input bit pattern, and outputs a result of the convolution operation to an external device.

11. The signal processing circuit according to claim 2, wherein
    the removal section performs DFT processing for the response of the second filter, divides a result of the DFT processing by the transfer function of the third filter, and performs IDFT processing for a result of the division.

12. A magnetic storage apparatus comprising:
    a medium onto which data is written;
    a head that performs readout operation from the medium so as to output a result of the readout operation as an analog signal;
    a conversion section that generates a digital signal based on the analog signal output from the head;
    a first filter that equalizes the output of the conversion section;
    a demodulation section that demodulates data from the output of the first filter;
    a modulation section that modulates the waveform based on the data demodulated by the demodulation section;
    a second filter that equalizes the output of the modulation section; and
    an adaptation section that adapts the response of the second filter such that the output of the second filter becomes equal to the output of the conversion section.

13. The magnetic storage apparatus according to claim 12, further comprising:
    a third filter that performs filtering of a read signal and inputs the filtered signal to the conversion section; and
    a removal section that removes the response of the third filter from the response of the second filter.

14. The magnetic storage apparatus according to claim 12, wherein
    the waveform of the response of the second filter is a solitary wave, and
    the conversion section performs convolution processing of a Di-Pulse waveform for the output of the demodulation section.

15. The magnetic storage apparatus according to claim 12, wherein
    the second filter is an FIR filter, and
    the response of the second filter is a TAP value of the second filter.

16. The magnetic storage apparatus according to claim 12, further comprising:

a first over sampling section that over-samples the output of the conversion section; and a second over sampling section that over-samples the output of the demodulation section, wherein the modulation section modulates the output of the second over sampling section, and the adaptation section adapts the response of the second filter such that the output of the second filter becomes equal to the output of the first over sampling section.

17. The magnetic storage apparatus according to claim 13, wherein the waveform of the output of the removal section is a solitary wave, and the magnetic storage apparatus further comprises a recording bit density calculation section that calculates a recording bit density based on the solitary wave output from the removal section.

18. The magnetic storage apparatus according to claim 13, further comprising a response calculation section that removes the response of an equalization target of the first filter from the output of the removal section and outputs a result of the removal as the response of the first filter.

19. The magnetic storage apparatus according to claim 18, further comprising a write section that writes the response of the first filter calculated by the response calculation section.

20. The magnetic storage apparatus according to claim 19, further comprising a response setting section that reads out the response of the first filter which is written by the write section and sets the read out response in the first filter.

* * * * *